United States Patent
Haas et al.

(10) Patent No.: US 6,989,918 B2
(45) Date of Patent: Jan. 24, 2006

(54) TRANSPARENCY ADAPTER WITH LIGHT TABLE

(75) Inventors: William R. Haas, Fort Collins, CO (US); Paul M. Leuthaeuser, Louisville, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 09/912,221

(22) Filed: Jul. 24, 2001

(65) Prior Publication Data

US 2003/0020970 A1 Jan. 30, 2003

(51) Int. Cl.
*H04N 1/04* (2006.01)

(52) U.S. Cl. .................. 358/487; 358/475; 358/497; 358/506; 358/527

(58) Field of Classification Search ............. 358/487, 358/506, 497, 527, 494, 474, 475, 509, 512–514, 358/482, 483; 355/67–70, 75; 399/211, 220, 399/378–380; 362/551, 552, 31; 250/234–236, 250/208.1
See application file for complete search history.

(56) References Cited

U.S. PATENT DOCUMENTS

| | | | |
|---|---|---|---|
| 3,737,911 A | 6/1973 | Sakuragi et al. | 340/10.4 |
| 5,282,081 A | 1/1994 | Chen et al. | 359/223 |
| 5,467,172 A | 11/1995 | Liao | 399/380 |
| 5,574,542 A * | 11/1996 | Brook, III | 399/380 |
| 5,574,665 A | 11/1996 | Narasimhan | 702/75 |
| 5,652,665 A | 7/1997 | Chen | 358/487 |
| 5,781,311 A * | 7/1998 | Inoue et al. | 358/475 |
| 5,822,714 A | 10/1998 | Cato | 702/108 |
| 5,986,774 A | 11/1999 | Han | 358/487 |
| 5,993,023 A * | 11/1999 | Lin | 362/223 |
| 6,163,385 A | 12/2000 | Kajander | 358/475 |
| 6,177,982 B1 * | 1/2001 | Snyder et al. | 355/75 |
| 6,185,011 B1 * | 2/2001 | William | 358/474 |
| 6,208,437 B1 * | 3/2001 | Neushul | 358/487 |
| 6,373,556 B1 * | 4/2002 | Gervais | 355/75 |
| 6,494,586 B1 * | 12/2002 | Huang et al. | 362/27 |
| 6,519,023 B1 * | 2/2003 | Chang | 355/18 |
| 6,567,191 B1 * | 5/2003 | Huang | 358/487 |
| 6,819,457 B2 * | 11/2004 | Sheng | 358/487 |

FOREIGN PATENT DOCUMENTS

| | | |
|---|---|---|
| EP | 0405695 A | 1/1991 |
| EP | 0556910 A | 8/1993 |
| EP | 0786688 A2 | 7/1997 |
| WO | WO 99/33017 A | 7/1999 |
| WO | WO 00/10122 A | 2/2000 |

OTHER PUBLICATIONS

Foreign Search Report, Jul. 18, 2003.
Search Report dated Jan. 3, 2003 for corresponding Application No. GB 0215722.0.

* cited by examiner

*Primary Examiner*—Cheukfan Lee

(57) ABSTRACT

A transparency adapter for use with a scanner comprising a scanner light source, a scanner platen and a scanner lid. The transparency adapter comprises a light table comprising a stationary light source separate from the scanner light source. The stationary light source comprises a light table operating state for illuminating transparent media for viewing and a transparency adapter operating state for illuminating transparent media while it is being scanned by the scanner, thereby creating a scanned image of the transparent media, the scanned image having an output orientation. The transparency adapter further comprises at least one mounting device on the light table to hold the transparent media in an input orientation during the light table operating state.

17 Claims, 6 Drawing Sheets

TRANSPARENCY ADAPTER WITH LIGHT TABLE

FIELD OF THE INVENTION

The present invention relates generally to light tables used to view transparent media and transparency adapters used with scanners, and more specifically to a combination transparency adapter and light table for use with a scanner.

BACKGROUND OF THE INVENTION

Scanning transparent media such as photographic slides, negatives, and the like, requires several activities. First, the transparent media is viewed on a light table or, if a light table is not available, by simply holding the transparent media up to a light source such as a ceiling light or window in order to select the correct negative, frame, etc. The selected transparent media must then be oriented correctly on a scanner platen. Since the scanner platen is typically not illuminated until scanning begins, any transparent media placed on the scanner platen is not viewable thereon. Thus, the transparent media must be oriented "blindly" on the scanner platen, i.e., the user not only must remember the orientation of the transparent media as it was viewed in the light, but he or she must then transfer the correct orientation of the transparent media to the scanner platen. With some scanner systems, a removable template may be provided which is adapted to hold and align transparencies on the scanner platen. While a light table or the like may be utilized to correctly orient the transparent media within a template, the template itself must then be "blindly" oriented on the scanner.

In order to scan transparent media on a flatbed scanner, a transparency adapter must be used. A conventional transparency adapter includes a light source which projects light through the transparent media and through the scanner platen, so that an image of the transparent media may be captured by a sensor, typically a charge-coupled device (CCD), in the scanner. Thus, not only does the scanner have its own light source, but also both the transparency adapter and the separate light table each have their own light source. While transparent media is more easily viewed with a light table than with a secondary source of light such as a ceiling light or a window, providing a separate light table along with a transparency adapter, each with its own light source, is costly and inefficient.

SUMMARY OF THE INVENTION

The present invention is directed to a transparency adapter for use with a scanner comprising a scanner light source, a scanner platen and a scanner lid. The transparency adapter comprises a light table comprising a stationary light source separate from the scanner light source. The stationary light source comprises a light table operating state for illuminating transparent media for viewing and a transparency adapter operating state for illuminating transparent media while it is being scanned by the scanner, thereby creating a scanned image of the transparent media, the scanned image having an output orientation. The transparency adapter further comprises at least one mounting device on the light table to hold the transparent media in an input orientation during the light table operating state.

The present invention is also directed to a scanner comprising a scanner light source, a scanner platen, a scanner lid, and a transparency adapter within the scanner lid. The transparency adapter comprises a light table comprising a stationary light source separate from the scanner light source. The stationary light source comprises a light table operating state for illuminating transparent media for viewing and a transparency adapter operating state for illuminating transparent media while it is being scanned by the scanner, thereby creating a scanned image of the transparent media, the scanned image having an output orientation. The transparency adapter also comprises at least one mounting device to hold the transparent media in an input orientation during the light table operating state.

The present invention is also directed to a method for scanning transparent media using a scanner comprising a scanner light source and a scanner platen. The method comprises placing the transparent media on a transparency adapter having a stationary light source that is separate from the scanner light source; utilizing the transparency adapter to orient the transparent media to an input orientation; directly transferring the input orientation to the scanner platen by closing the transparency adapter; and scanning the transparent media to obtain a scanned image with an output orientation while the stationary light source illuminates the transparent media, wherein the output orientation is the same as the input orientation.

DETAILED DESCRIPTION OF THE INVENTION

Figure 1:
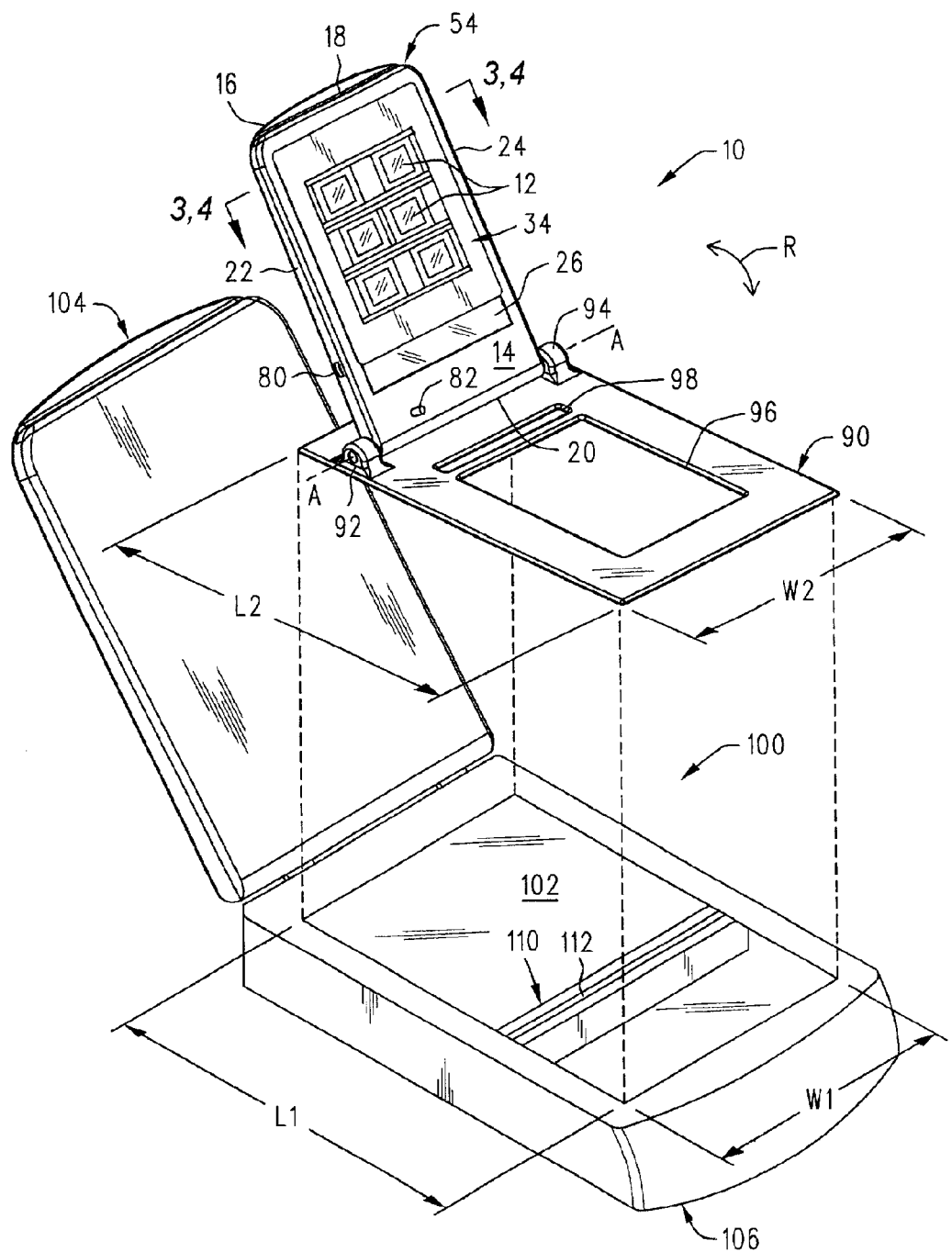
FIG. 1 is a perspective view of a first exemplary embodiment of a transparency adapter with a light table as an accessory to a standard scanner.
Figure 2:
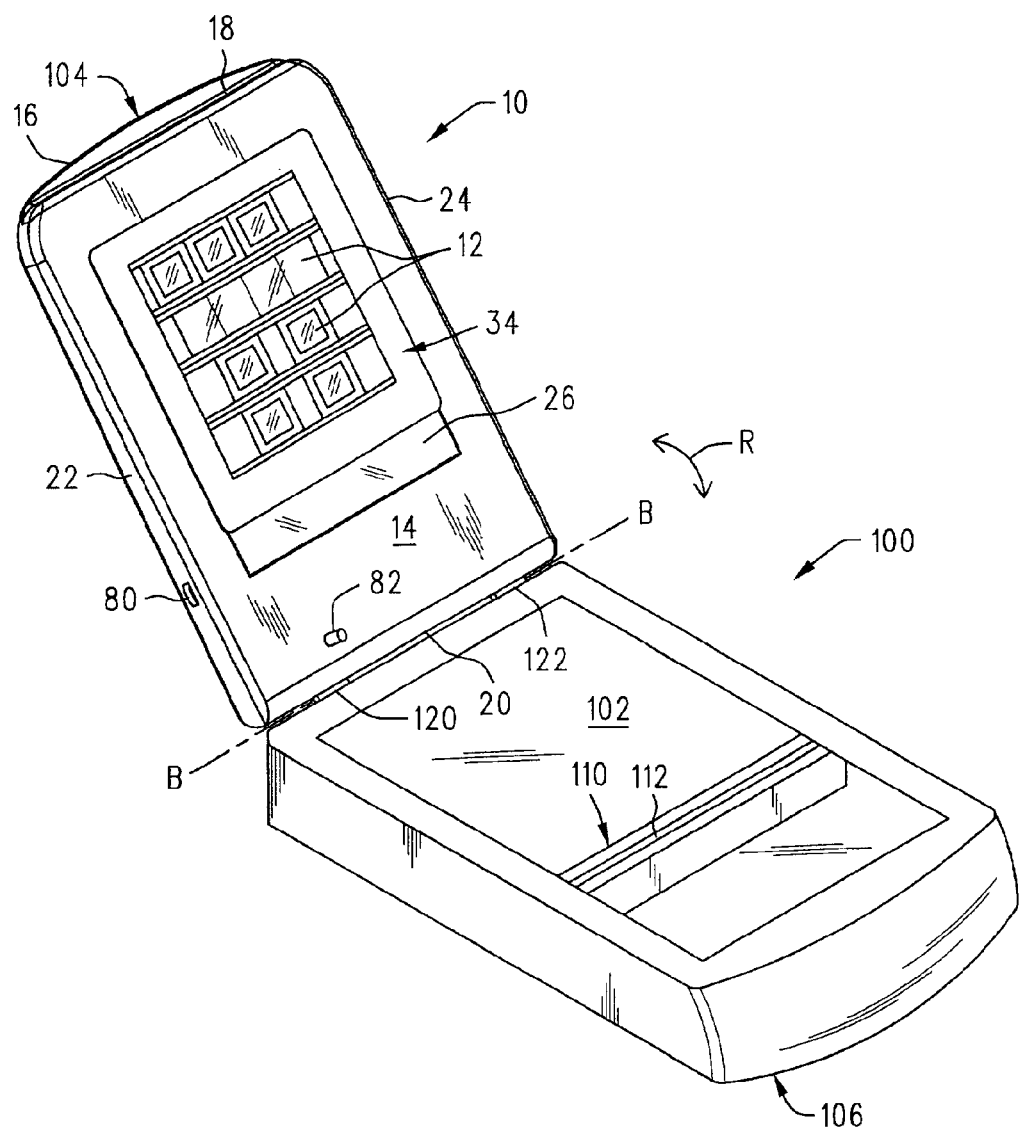
FIG. 2 is a perspective view of a second exemplary embodiment of the transparency adapter with a light table as an integrated component in a scanner lid.

As shown in FIGS. 1–11, the present invention provides a transparency adapter with a light table 10 (also referred to herein as a "transparency adapter/light table) that allows a user to view and correctly orient transparent media 12 in a "WYSIWYG" ("what you see is what you get") manner prior to scanning. During a light table operating state whereby the transparency adapter/light table 10 is open (FIGS. 1, 2, 8 and 10), the transparent media 12 is illuminated by the transparency adapter/light table 10 for viewing. The properly oriented transparent media 12 may then be directly transferred to a scanner platen 102 by simply closing the transparency adapter/light table 10 as discussed in further detail below. During a transparency adapter operating state whereby the transparency adapter/light table 10 is closed (FIGS. 9 and 11), the transparent media 12 (not shown in these figures) is illuminated by the transparency adapter/light table 10 for scanning. Thus, the transparency adapter/light table 10 of the present invention may be used, first, as a light table to orient transparent media 12, and, second, as a transparency adapter to project light onto the transparent media 12 and through the scanner platen 102 while scanning. In a first exemplary embodiment as best shown in FIG. 1, the transparency adapter/light table 10 may be an accessory item used with a conventional scanner 100. In a second exemplary embodiment as best shown in FIG. 2, the transparency adapter/light table 10 may be an integrated component of a scanner lid 104.

Referring to FIGS. 1–2, a conventional scanner 100 may be provided having a platen 102, a lid 104, and a housing 106. The scanner housing 106 may house a moveable carriage 110 which includes therein a conventional scanner light source 112 and an image input device (not shown) such as a charge-coupled device (CCD). As shown in FIG. 1, a conventional scanner platen 102 may have a length L1 of, for example, 12 inches and a width W2 of, for example, 9 inches. It will be appreciated, however, that the present invention may be utilized with scanners having platens of various sizes, and that the length and width noted above are merely exemplary. As described in more detail below relative to FIGS. 10 and 11, the scanner 100 is adapted to scan transparent media 12, utilizing the transparency adapter/light table 10 while scanning, thereby creating a machine-readable data image of the transparent media 12 to be displayed, printed, stored, or the like.

Figure 3:
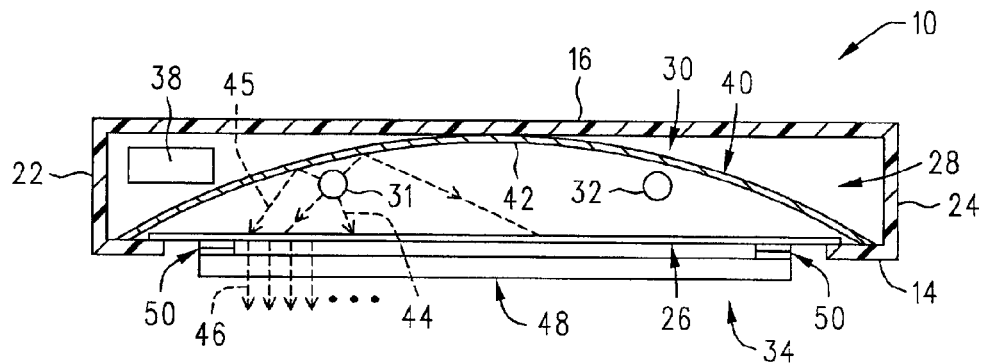
FIG. 3 is a simplified, partially schematic, cross-sectional view of the transparency adapter with a light table of FIG. 1 or 2 with a first exemplary embodiment of a transparent media mounting device.
Figure 4:
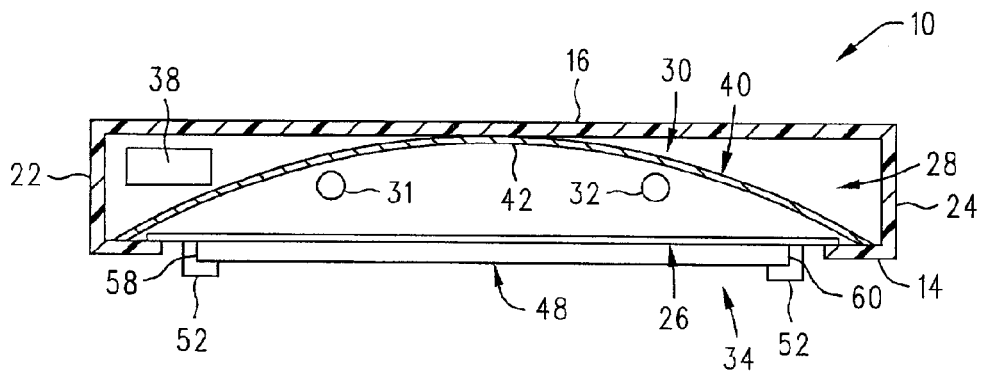
FIG. 4 is a simplified, partially schematic, cross-sectional view of the transparency adapter with a light table of FIG. 1 or 2 with a second exemplary embodiment of a transparent media mounting device.

As shown in FIGS. 1–4, the transparency adapter/light table 10 may comprise a front surface 14 and a back surface 16 which may be joined along a first side 18, a second side 20, a third side 22, and a fourth side 24, creating an internal cavity 28 (FIGS. 3 and 4). A platen 26 may be provided on the front surface 14 of the transparency adapter/light table 10. A mounting device 34, described in further detail below, may also be provided to hold the transparent media 12 in place against the platen 26. Transparent media 12 mounted on the mounting device 34 may be illuminated by a stationary light source 30 (FIGS. 3 and 4) contained within the internal cavity 28 of the transparency adapter/light table 10. In order to allow light from the stationary light source 30 to pass through the transparent media 12, the transparency adapter/light table platen 26 is preferably constructed from a translucent material such as textured clear polycarbonate. As described in more detail below relative to the operation of the transparency adapter/light table 10, the stationary light source 30 (FIGS. 3 and 4) is physically separate from the light source 112 in the scanner 100 (FIGS. 1 and 2) and performs an entirely different function than that performed by the scanner light source 112.

The stationary light source 30 may comprise, for example, one or more cold cathode, fluorescent lamps 31, 32 as shown in FIGS. 3 and 4. The lamps 31, 32 may be powered by and electrically connected to an electrical inverter 38 (shown schematically) connected to a power source (not shown), which may be the same power source that provides electrical power to the scanner. Such cold cathode, fluorescent lamps are widely available and may be obtained from, for example, Nam Kwong Electric Co. Ltd., 381–389 Sha Tsui Road, Young Ya Industrial Building, 1 C/D, Tsuen Wan, Hong Kong.

As shown in FIGS. 3 and 4, the stationary light source 30 may further comprise a reflector 40 positioned adjacent to the lamps 31, 32. The reflector 40 may comprise a light-reflective surface 42 which may be curved as shown in FIGS. 3 and 4 so that light from the lamps 31, 32 may be reflected onto the transparency adapter/light table platen 26. Thus, as shown in FIG. 3, the stationary light source 30 may illuminate the platen 26 with direct light (e.g., 44) from the lamps 31, 32 and reflected light (e.g., 45) from the reflector 40. The transparency adapter/light table platen 26 may be adapted to diffuse the light 44, 45 received from the stationary light source 30 and transmit the diffused light (e.g., 46) through the platen 26. As noted above, the platen 26 may be textured to assist in diffusing the light 44, 45.

Figure 5:
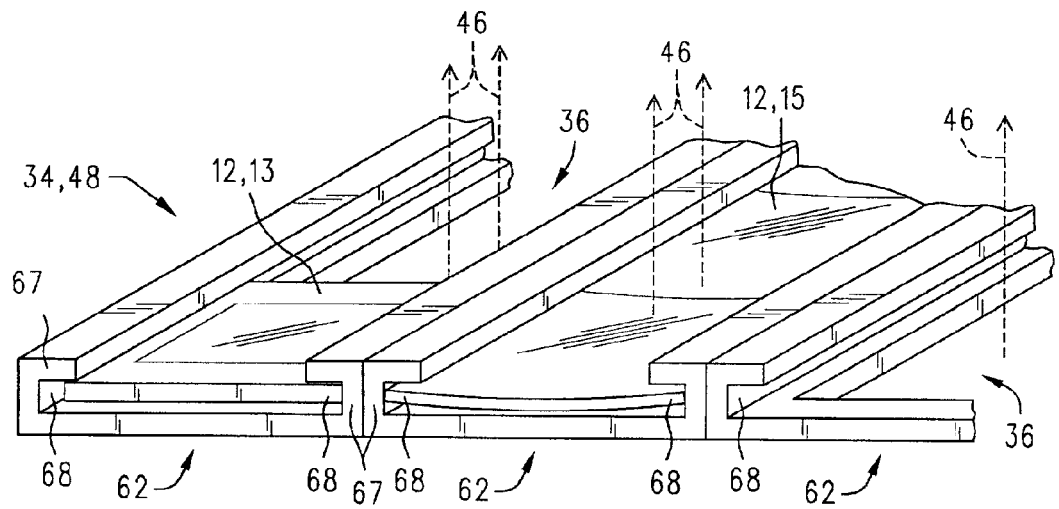
FIG. 5 is a perspective view of a first exemplary template from a transparent media mounting device.
Figure 6:
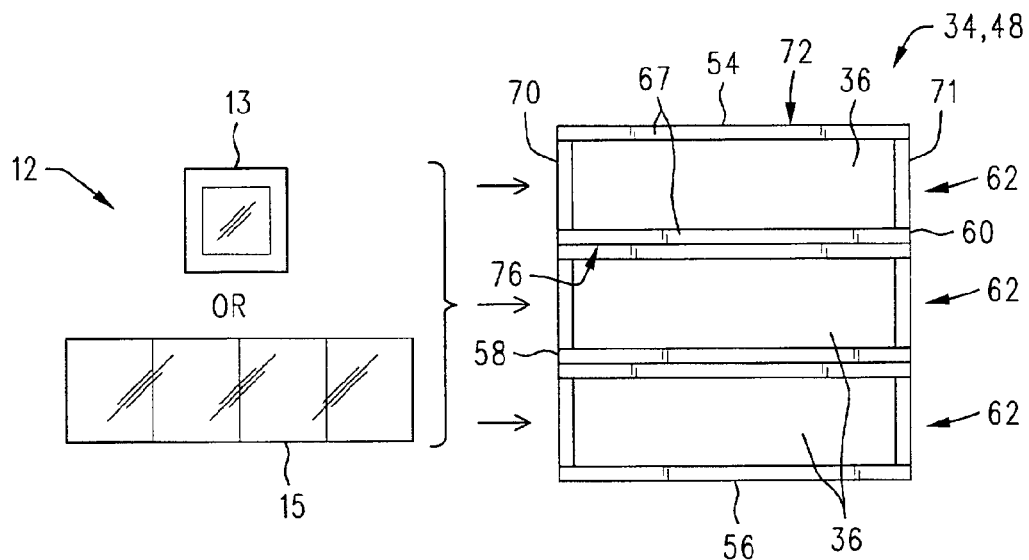
FIG. 6 is a front view of the template of FIG. 5.
Figure 7:
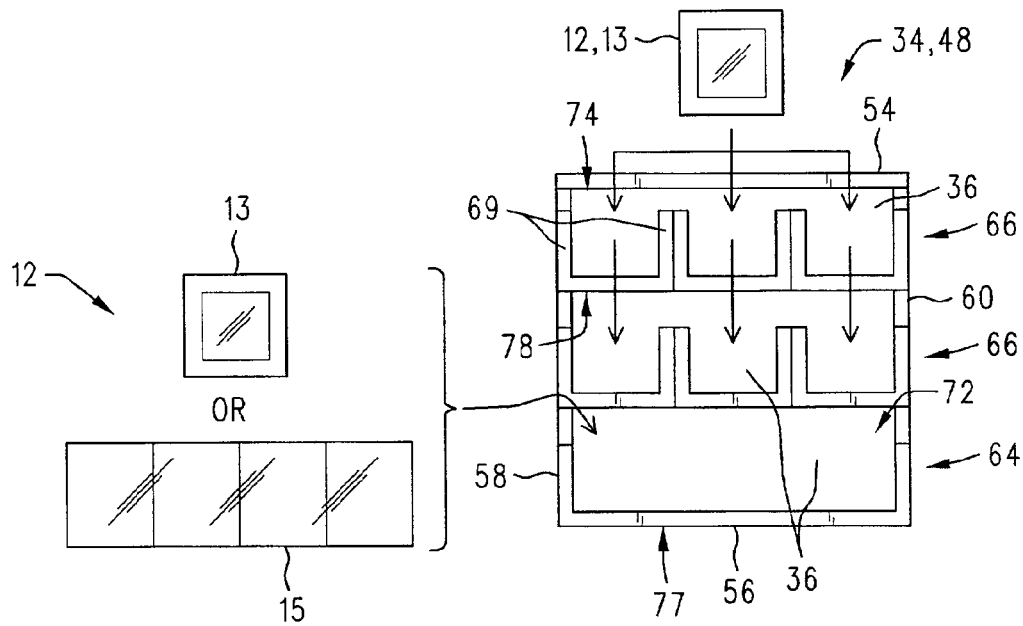
FIG. 7 is a front view of a second exemplary template from a transparent media mounting device.

The mounting device 34, which is adapted to hold the transparent media 12 in place against the platen 26, may have a variety of different configurations depending on the particular application. For example, the mounting device 34 may be adapted to hold several slides (e.g., 13, FIGS. 6 and 7) as indicated in FIGS. 1 and 2. As another example, when scanning negatives from film stock (e.g., 15, FIGS. 6 and 7), the geometry of the mounting device 34 may allow for multiple frames of the film stock to be previewed and scanned. The mounting device 34 may also be adapted to simultaneously hold several different types of transparent media 12 such as slides and film stock. Alternatively, the mounting device 34 may comprise several removable templates 48, FIGS. 5–7, that are each adapted to hold varying types of transparent media 12. As shown in FIGS. 5–7, the mounting device 34 (and removable template 48, if present) may comprise a plurality of openings 36 which enable diffused light (e.g., 46, FIG. 5) to pass directly through the transparent media 12 from the stationary light source 30 and platen 26. In this manner, the mounting device 34 (with or without a removable template 48) does not impede or interfere with the passage of light 46 through the transparent media 12.

As best shown in FIGS. 3 and 4, a template 48 may be removable from the transparency adapter/light table platen 26 using temporary attachment devices 50, 52. Examples of a first type of temporary attachment device 50, FIG. 3, may be magnets, snaps, hook and loop-type fasteners, or the like. At least one temporary attachment device 50 may be attached to the platen 26 (or, alternatively, to the front surface 14 of the transparency adapter/light table 10), and a corresponding temporary attachment device 50 may be attached to the template 48 at any position, but preferably along the periphery thereof so as not to interfere with the transmission of light through media 12 mounted within the template 48. Another type of temporary attachment device 52, FIG. 4, may be comprised of a plurality of brackets which are adapted to temporarily hold the template 48 in place against the platen 26. The brackets 52 preferably extend across the template 48 only so far as to support the template 48, and should not interfere with the transmission of light through the media 12 within the template 48. The brackets 52 may be positioned adjacent to two or three of the upper edge 54, lower edge 56, and side edges 58, 60 (see FIG. 6) of the template 48 in order to allow a user to slide the template 48 in place against the platen 26. Thus, as shown in FIG. 4, a bracket 52 may be placed adjacent to the side edges 58, 60 of the template 48, and a bracket (not shown) may also be placed adjacent to the lower edge 56 (FIG. 6) of the template 48 in order to support the template 48 especially when the transparency adapter/light table 10 is open (FIGS. 1, 2, 8 and 10). As another example (not shown), brackets may be provided adjacent to the top edge 54 and bottom edge 56 of the template 48, leaving the side edges 58, 60 exposed.

As shown in FIGS. 5–7, the template 48 may comprise a plurality of media holding locations 62, 64, 66 adapted to receive media 12 and hold it against the transparency adapter/light table platen 26 (FIGS. 1 and 2). A first type of media holding location 62 (FIGS. 5 and 6) or 64 (FIG. 7) may be provided which is adapted to hold several different types of media 12 such as, for example, slides 13 and film stock 15. Alternatively, as shown in FIG. 7, a second type of media holding location 66 may be provided that is adapted to hold a particular type of media such as, for example, a slide 13. In any embodiment, the media holding locations 62, 64, 66 may be defined by a plurality of support members (e.g., 67, FIGS. 5 and 6; 69, FIG. 7). As best shown in FIG. 5, the support members 67 may form channels 68 in order to allow a user to slide media 12 into the media holding locations 62, 64, 66 from at least one side (e.g., top, left or right sides) of each media holding location. For example, as shown in FIG. 6, the media 12 may be slid into a media holding location 62 from either the left side 70 or the right side 71 thereof. As shown in FIG. 7, the media 12 may be slid into a media holding location 64 or 66 from the top side 72 or 74, respectively, thereof. Due to lack to adequate support, the bottom side 76, 77, 78 of a media holding location 62, 64, 66, respectively, is usually not left completely open. However, it is to be understood that the support members 67, 69 shown in FIGS. 5–7 are merely exemplary, and that any support member adapted to securely, removably hold media 12 within a template 48 may be utilized.

As best shown in FIGS. 1 and 2, the transparency adapter/light table 10 may further comprise at least one controller 80, 82 which may be adapted to control any function of the stationary light source 30 (FIGS. 3 and 4). For example, an intensity controller 80 and a state controller 82 may each be operatively connected to the stationary light source 30. The intensity controller 80 may comprise, for example, a knob, dial, or the like located on a side (e.g., 22) of the transparency adapter/light table 10 which may be manipulated by a user to manually turn the stationary light source on or off and to manually adjust the intensity of the stationary light source 30 as needed for optimal viewing of the transparent media 12. The state controller 82 may be used to disable the intensity controller 80 so that the stationary light source 30 is at a fixed, predetermined intensity while the transparent media 12 is being scanned. Specifically, the state controller 82 may be adapted to sense the position of the transparency adapter/light table 10 (e.g., open or closed), disabling the intensity controller 80 when the transparency adapter/light table 10 is closed and placing the stationary light source 30 in the transparency adapter operating state. The state controller 82 may also sense when the transparency adapter/light table 10 is open, thereby enabling the intensity controller 80 so that the stationary light source 30 may be turned on or off and the intensity of the stationary light source 30 (now in the light table operating state) may be adjusted as needed. The state controller 82 may comprise, for example, a switch, toggle, proximity sensor, or the like well-known in the art which may be mounted, for example, on the front 14 of the transparency adapter/light table 10. The state controller 82 may be adapted to be automatically toggled when the transparency adapter/light table 10 is opened or closed.

In an alternative embodiment (not shown), the stationary light source may be controlled by software. Thus, instead of (or in addition to) comprising a manually-operable dial, knob, switch, toggle, or the like, the intensity and state controllers may comprise software which allows a user to remotely control, for example, the intensity of the stationary light source for viewing purposes (which may include the ability to remotely turn the stationary light source on or off). When scanning commences, the software may be adapted to automatically override the intensity controller and set the intensity of the stationary light source to an appropriate level for scanning.

Figure 8:
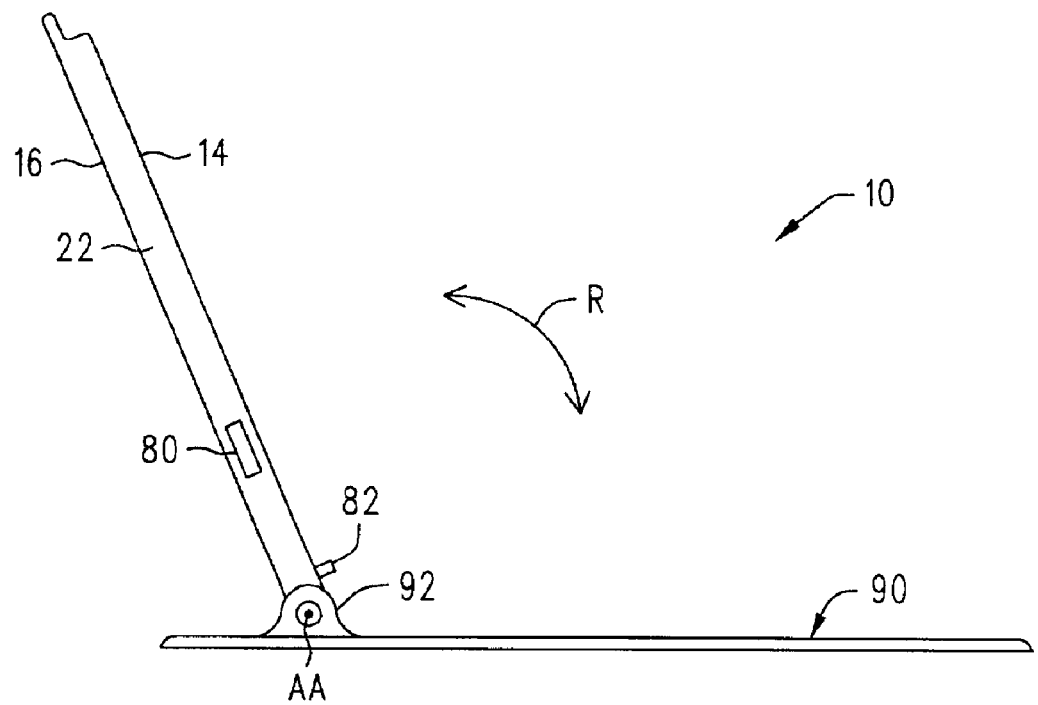
FIG. 8 is a side view of the transparency adapter with a light table of FIG. 1 in an open/light table operating state.
Figure 9:
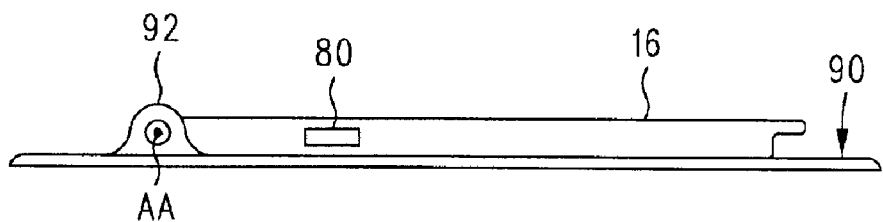
FIG. 9 is a side view of the transparency adapter with a light table of FIG. 1 in a closed/transparency adapter operating state.

In the first exemplary embodiment shown in FIGS. 1, 8 and 9, the transparency adapter/light table 10 of the present invention may be an accessory item for use with a conventional scanner 100. The transparency adapter/light table 10 may be pivotally attached by, for example, a pair of hinges 92, 94 to a scanner template 90. The scanner template 90 may be positioned on the scanner platen 102 to align the transparency adapter/light table 10 thereon at any time before, during, or after the light table operating state (but before the transparency adapter operating state commences). To facilitate this alignment and in order to completely cover the scanner platen 102 during scanning, the scanner template width W2 and/or the scanner template length L2 (most preferably both) may be the same as the scanner width W1 and scanner length L1, respectively. To place the transparency adapter/light table 10 in an open or a closed position, the transparency adapter/light table 10 may be pivotally rotated around axis AA (which is defined by the hinges 92, 94) in a rotational direction R. The scanner template 90 may have at least one window 96 through which the transparent media 12 may be scanned during the transparency adapter operating state. A calibration window 98 may also be provided in the scanner template 90 to allow for sampling of the light emitted from the stationary light source 30 (FIGS. 3 and 4) as is well-known in the art.

Figure 10:
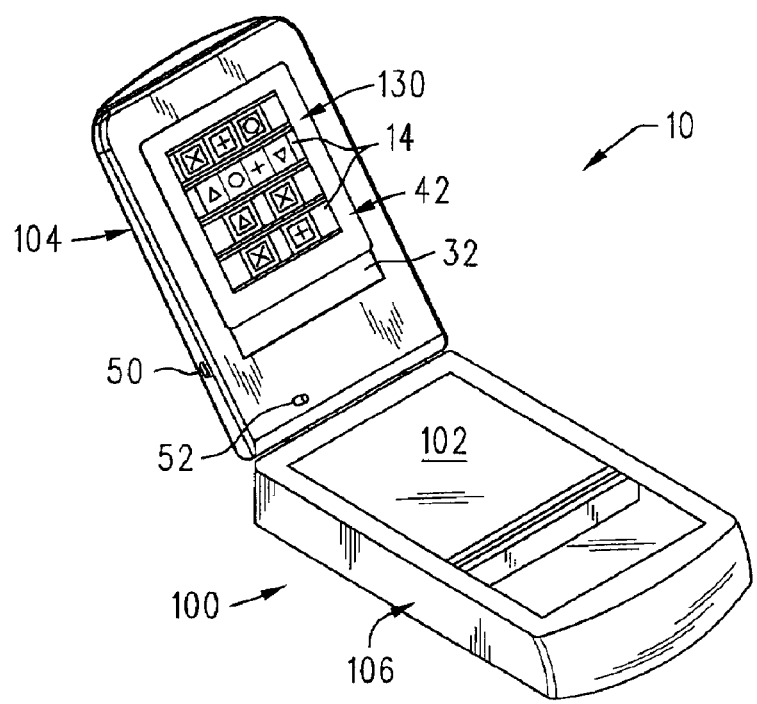
FIG. 10 is a perspective view of the transparency adapter with a light table of FIG. 2 in an open/light table operating state having media in an input orientation.
Figure 11:
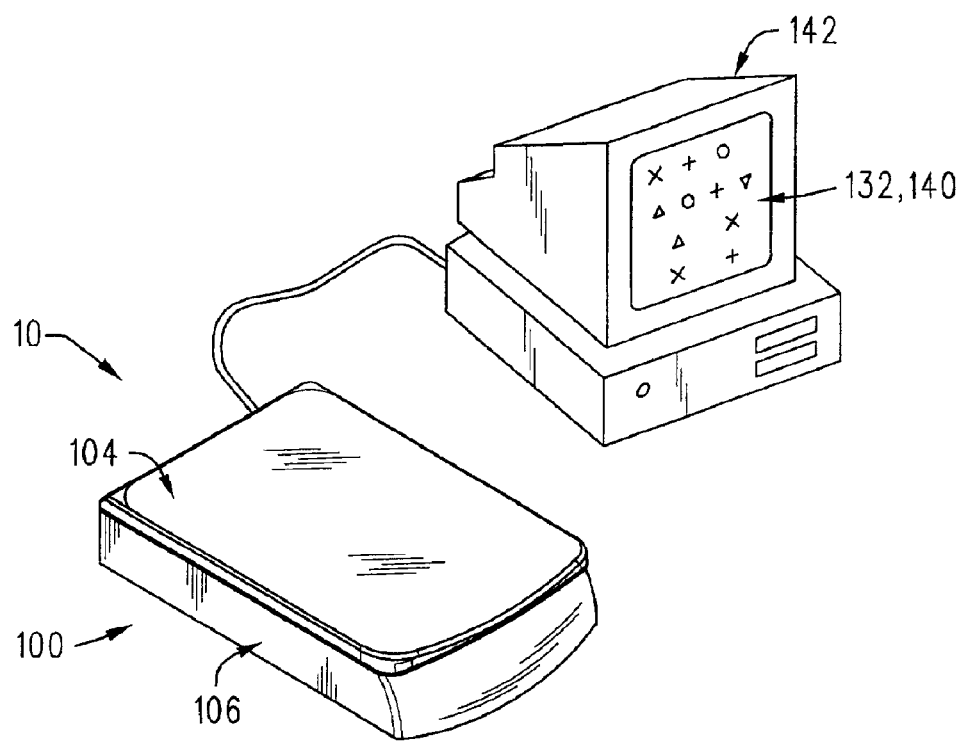
FIG. 11 is a perspective view of the transparency adapter of FIG. 10 in a closed/transparency adapter operating state and a computer displaying a scanned image of the media in an output orientation.

In the second exemplary embodiment as shown in FIGS. 2, 10 and 11, the transparency adapter/light table 10 may be integrally formed within the scanner lid 104. The transparency adapter/light table 10 may be substantially identical to that described above relative to the first exemplary embodiment shown in FIG. 1, except that no scanner template (90, FIG. 1) is required in this embodiment. Instead, the scanner lid 104 may be pivotally attached to the scanner housing 106 with hinges 120, 122 (FIG. 2), or the like. To place the transparency adapter/light table 10 in an open or a closed position, the scanner lid 104 may be pivotally rotated around axis BB (which is defined by the hinges 120, 122, FIG. 2) in a rotational direction R. The scanner lid 104 in this embodiment may also be removable and replaceable with a conventional scanner lid 104 as shown in FIG. 1 so that the transparency adapter/light table 10 may be utilized only when needed.

Having described the transparency adapter/light table 10 and its associated components, the operation thereof will now be described. As mentioned above, the invention may alternately be used in a light table operating state (FIGS. 1, 2, 8 and 10) and a transparency adapter operating state (FIGS. 9 and 11).

With reference to FIGS. 1, 2, 8 and 10, in the light table operating state, the transparent media 12 may be placed on the transparency adapter/light table platen 26 within the mounting device 34. The transparency adapter/light table 10 is in a position such as that shown in figures which allows the transparent media 12 to be viewed. In this operating state, the transparent media 12 may be viewed and placed in a desired orientation 130, FIG. 10, which will hereinafter be referred to as the "input orientation". The intensity of light emitted from the stationary light source 30 (FIGS. 3 and 4) should be sufficient to see the image contained in the transparent media 12. The intensity controller 80 may be used to adjust (i.e., either brighten or dim) the stationary light source 30 in order to obtain an adequate viewing level.

Once the transparent media 12 has been selected and placed in the desired input orientation 130, the user may close the transparency adapter/light table 10 as shown in FIGS. 9 and 11 to invoke a transparency adapter operating state. The state controller 82 may sense the change in transparency adapter/light table 10 position, disabling the intensity controller 80 and invoking the transparency adapter operating state. During this operating state, the stationary light source 30 (FIGS. 3 and 4) illuminates the transparent media 12 while it is being scanned by the scanner 100. Specifically, the stationary light source 30 projects light through the transparent media 12 and through the scanner platen 102 during scanning of the transparent media 12 so that an image of the transparent media may be captured by the image input device (such as a CCD, not shown) in the scanner 100. The scanning of the illuminated transparent media 12 creates a scanned image 132 having an output orientation 140 as shown in FIG. 11. The scanned image 132 may be comprised of image data that is in machine readable, digital format which may be displayed on a computer monitor 142 as shown. The scanned image 132 can also be utilized for a number of objectives including, but not limited to, manipulation, reproduction, distribution, and storage. The output orientation 140 (FIG. 11) is preferably the same as the input orientation 130 (FIG. 10) so that a user may view and correctly orient transparent media 12 in a "WYSI-WYG" ("what you see is what you get") manner prior to scanning.

Accordingly, and with reference to FIGS. 10 and 11, the present invention may also be directed to a method for scanning transparent media 12 using a scanner 100 comprising a scanner light source and a scanner platen 102. The first step of the method may involve placing the transparent media 12 on the transparency adapter/light table 10 described above. Next, the transparency adapter/light table 10 is utilized to orient the transparent media 12 to an input orientation 130. Then, the input orientation 130 is directly transferred to the scanner platen 102 by closing the transparency adapter/light table 10. Finally, the transparent media 12 is scanned to obtain a scanned image 132 with an output orientation 140 while the stationary light source 30 (FIGS. 3 and 4) illuminates the transparent media 12. As noted above, the output orientation 140 is preferably the same as the input orientation 130.

We claim:

1. A transparency adapter for use with a scanner comprising a scanner light source, a scanner platen and a scanner lid, said transparency adapter comprising:
   a) a light table comprising a stationary light source separate from said scanner light source, said stationary light source comprising:
      i) a light table operating state for illuminating transparent media for viewing; and
      ii) a transparency adapter operating state for illuminating said transparent media while said transparent media is being scanned by said scanner, thereby creating a scanned image of said transparent media, said scanned image having an output orientation; and
   b) at least one mounting device on said light table to hold said transparent media in an input orientation during said light table operating state.

2. The transparency adapter of claim 1, said mounting device comprising at least one removable media template having a plurality of media holding locations which hold said transparent media within said mounting device during said light table operating state and said transparency adapter operating state.

3. The transparency adapter of claim 1 further comprising a light table platen positioned between said stationary light source and said mounting device, wherein said stationary light source, said mounting device, and said light table platen are incorporated within said scanner lid.

4. The transparency adapter of claim 3, said stationary light source further comprising:
   a) a reflector having a light-reflective surface; and
   b) at least one cold cathode, fluorescent lamp positioned between said reflector and said light table platen.

5. The transparency adapter of claim 1 further comprising a scanner template which allows said transparency adapter to rest on said scanner platen.

6. The transparency adapter of claim 1 further comprising a scanner template which allows said transparency adapter to rest on said scanner platen and a light table platen positioned between said stationary light source and said mounting device, wherein said stationary light source, said mounting device, and said light table platen are hingedly secured to said scanner template.

7. The transparency adapter of claim 6, said stationary light source further comprising:
   a) a reflector having a light-reflective surface; and
   b) at least one cold cathode, fluorescent lamp positioned between said reflector and said light table platen.

8. The transparency adapter of claim 1 wherein said input orientation is the same as said output orientation.

9. The transparency adapter of claim 1 further comprising at least one controller operatively connected to said stationary light source, said at least one controller comprising an intensity controller to adjust the intensity of said stationary light source during said light table operating state.

10. The transparency adapter of claim 9, said at least one controller further comprising a state controller to disable said intensity controller during said transparency adapter operating state.

11. A scanner, comprising:
   a) a scanner light source;
   b) a scanner platen;
   c) a scanner lid; and
   d) a transparency adapter within said scanner lid, said transparency adapter comprising:
      i) a light table comprising a stationary light source separate from said scanner light source, said stationary light source comprising a light table operating state for illuminating transparent media for viewing and a transparency adapter operating state for illuminating said transparent media while said transparent media is being scanned by said scanner, thereby creating a scanned image of said transparent media, said scanned image having an output orientation; and
      ii) at least one mounting device to hold said transparent media in an input orientation during said light table operating state.

12. The scanner of claim 11, said transparency adapter further comprising a light table platen and said stationary light source further comprising:
   a) a reflector having a light-reflective surface; and
   b) at least one cold cathode, fluorescent lamp positioned between said reflector and said light table platen.

13. The scanner of claim 11, said mounting device comprising at least one removable media template having a plurality of media holding locations which hold said transparent media within said mounting device during said light table operating state and said transparency adapter operating state.

14. The scanner of claim 11, said transparency adapter further comprising at least one controller comprising an intensity controller to adjust the intensity of said stationary light source during said light table operating state.

15. The scanner of claim 14, said at least one controller further comprising a state controller to disable said intensity controller during said transparency adapter operating state.

16. The scanner of claim 11 wherein said input orientation is the same as said output orientation.

17. A method for scanning transparent media using a scanner comprising a scanner light source and a scanner platen, comprising:

a) placing said transparent media on a mounting device of a transparency adapter having a stationary light source that is separate from said scanner light source;

b) utilizing said transparency adapter in a light table operating state to orient said transparent media to an input orientation, wherein said transparency adapter in said light table operating state illuminates said transparent media with said stationary light source for viewing;

c) directly transferring said input orientation to said scanner platen by closing said transparency adapter; and d) scanning said transparent media with said scanner while said transparency adapter is in a transparency adapter operating state to obtain a scanned image with an output orientation, wherein said output orientation is the same as said input orientation, wherein said transparency adapter in said transparency adapter operating state illuminates said transparent media with said stationary light source for scanning with said scanner.

* * * * *